United States Patent
Kim et al.

(10) Patent No.: US 8,411,540 B2
(45) Date of Patent: Apr. 2, 2013

(54) RECORDING AND/OR REPRODUCING APPARATUS AND CONTROL METHOD THEREOF

(75) Inventors: Sung Chul Kim, Suwon-si (KR); Hyoung Nam Kim, Suwon-si (KR); Hyung Keuk Lim, Suwon-si (KR); Sang Min Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 755 days.

(21) Appl. No.: 12/099,228

(22) Filed: Apr. 8, 2008

(65) Prior Publication Data

US 2008/0310271 A1 Dec. 18, 2008

(30) Foreign Application Priority Data

Jun. 12, 2007 (KR) .................. 10-2007-0057286

(51) Int. Cl.
*G11B 7/00* (2006.01)
(52) U.S. Cl. ........................................ 369/53.2
(58) Field of Classification Search .................. 369/53.2
See application file for complete search history.

(56) References Cited

U.S. PATENT DOCUMENTS

| | | | |
|---|---|---|---|
| 7,212,873 B1 * | 5/2007 | Townsend et al. | 700/94 |
| 7,420,903 B2 * | 9/2008 | Sakurai et al. | 369/53.2 |
| 2003/0135550 A1 * | 7/2003 | Koyata et al. | 709/203 |
| 2006/0044975 A1 * | 3/2006 | Miyake et al. | 369/53.2 |
| 2006/0114760 A1 * | 6/2006 | Togashi et al. | 369/30.01 |
| 2007/0206467 A1 * | 9/2007 | Li et al. | 369/53.2 |
| 2007/0286032 A1 * | 12/2007 | Townsend et al. | 369/27.01 |
| 2009/0092026 A1 * | 4/2009 | Watanabe et al. | 369/100 |

FOREIGN PATENT DOCUMENTS

| | | | |
|---|---|---|---|
| JP | 07141770 | | 6/1995 |
| JP | 07141770 A | * | 6/1995 |
| JP | 10-283718 | | 10/1998 |
| JP | 10283718 | | 10/1998 |
| JP | 2004-206808 | | 7/2004 |
| JP | 2004206808 A | * | 7/2004 |

OTHER PUBLICATIONS

Korean Search Report issued Jun. 29, 2009 in KR Application No. 2007-0057286.
Korean Search Report dated Oct. 30, 2008 in KR Application No. 2007-0057286.

* cited by examiner

*Primary Examiner* — Wayne Young
*Assistant Examiner* — Brenda Bernardi
(74) *Attorney, Agent, or Firm* — Stanzione & Kim, LLP

(57) ABSTRACT

A recording and/or reproducing apparatus outputs a loading time of a recording medium through a display to inform a user of the loading time, and a control method thereof. The recording and/or reproducing apparatus includes a calculation unit to calculate loading time of a recording medium when the recording medium is inserted into the recording and/or reproducing apparatus, and an output unit to output the calculated loading time to a display.

28 Claims, 4 Drawing Sheets

FIG. 2

| type / finalization state | DVD-RW(VR) | DVD-RW(Video) | DVD-R(VR) | DVD-R(Video) | DVD+R | DVD+R Dual | DVD+RW | DVD Video |
|---|---|---|---|---|---|---|---|---|
| finalize | 3 + P | 3 + P | 3.3 + P | 2.4 + P | 1*0.001m+P | 1*0.001m+P | 1*0.001m+P | P |
| unfinalize | 1*0.05n+ 1*0.001m + P | 1*0.03n+ 1*0.001m + P | 1*0.03n+ 1*0.001m + P | 1*0.03n+ 1*0.001m + P | 1*0.001m+P | 1*0.001m+P | 1*0.001m+P | P | loading time when each disk is in blank state =
P , data capacity of recording medium = m , number of titles = n

RECORDING AND/OR REPRODUCING APPARATUS AND CONTROL METHOD THEREOF

CROSS-REFERENCE TO RELATED APPLICATIONS

This application claims priority under 35 U.S.C. §119(a) from Korean Patent Application No. 2007-57286, filed on Jun. 12, 2007, in the Korean Intellectual Property Office, the disclosure of which is incorporated herein in its entirety by reference.

BACKGROUND OF THE INVENTION

1. Field of the Invention

The present general inventive concept relates to a recording and/or reproducing apparatus, and more particularly relates to a recording and/or reproducing apparatus capable of outputting loading time of a recording medium through a display, and a control method thereof.

2. Description of the Related Art

With the development of image and sound media, a recording medium, which can store high quality video and audio data for a long time, e.g. an optical disk such as a DVD (Digital Versatile Disc), has been developed for commercialization. Further, an optical disk system, which can record video and audio data in an optical disk and reproduce the video and audio data, e.g. a DVD recorder, has also been developed for commercialization. Such a DVD recorder reproduces video and/or audio recorded on a DVD and outputs the video and/or audio through a screen and/or a speaker. Further, the DVD recorder reproduces and outputs information recorded on the DVD, and records external input on the DVD and then reproduces the external input, in which the external input comprises broadcasting signals transmitted from a broadcasting station, or video and audio signals input through an apparatus (e.g. a digital camera) that outputs video and audio. The DVD recorder includes devices such as a DVD recorder having a record tray and a reproduction tray in one set, a combo recorder having a DVD tray and a VCR deck in one set, and a DVD•HDD hybrid recorder having a HDD (hard disc drive) therein.

If an optical disk is inserted into a recording and/or reproducing apparatus such as a DVD recorder or a DVD•HDD hybrid recorder that reproduces video and/or audio data, the recording and/or reproducing apparatus performs a loading operation relative to the inserted optical disk.

Recently, as the capacity of a recording medium such as an optical disk has increased, time (i.e., loading time) required for loading the recording medium has also increased. However, as the loading time is not displayed, users must wait for a long time until the loading is completed to determine that the recording medium has loaded.

Further, if a defective recording medium is inserted into the recording and/or reproducing apparatus, a condition known as infinite loading occurs. In this case, users cannot determine if this phenomenon is infinite loading or the recording medium is taking an increased length of time to load.

SUMMARY OF THE INVENTION

Accordingly, it is an aspect of the present general inventive concept to provide a recording and/or reproducing apparatus having a modified structure capable of outputting the loading time of a recording medium through a display and informing users of the loading time, and a control method thereof.

Additional aspects and/or utilities of the present general inventive concept will be set forth in part in the description which follows and, in part, will be apparent from the description, or may be learned by practice of the general inventive concept.

The foregoing and/or other aspects and utilities of the general inventive concept may be achieved by providing a recording and/or reproducing apparatus including a calculation unit to calculate loading time of a recording medium when the recording medium is inserted into the recording and/or reproducing apparatus, and an output unit to output the calculated loading time to a display.

The recording and/or reproducing apparatus may further include a reading unit to read record information from the inserted recording medium, and a storage unit with previously stored loading calculation equations, where the equations are based at least in part on record information.

The record information may include data indicating at least one type of recording medium, an existence of recorded data on the recording medium, a finalized state of the recording medium (i.e., finalized or unfinalized), the number of titles, and data capacity of the recording medium, or any combination thereof.

The foregoing and/or other aspects and utilities of the general inventive concept may be also achieved by providing a recording and/or reproducing apparatus including a reading unit to read record information from a recording medium when the recording medium is inserted into the recording and/or reproducing apparatus, a storage unit with one or more previously stored loading calculation equations according to a type of recording medium, a calculation unit to calculate loading time of the inserted recording medium by using at least a portion of the record information and at least one the loading calculation equations, and an output unit to output the calculated loading time to a display.

The record information may include data indicating the type of the recording medium, data capacity of the recording medium, a finalization state of the recording medium, or the number of titles, or any combination thereof.

The recording and/or reproducing apparatus may further include a selector to select a loading calculation equation from one or more stored loading calculation equations based at least in part on at least a portion of the record information.

The foregoing and/or other aspects and utilities of the general inventive concept may also be achieved by providing a recording and/or reproducing apparatus including a reading unit to read record information from a recording medium when the recording medium is inserted into the recording and/or reproducing apparatus, a storage unit with previously stored loading calculation equations according to a type and finalization state of a recording medium, a calculation unit to calculate loading time by using at least a portion of the record information and the loading calculation equation, and an output unit to output the loading time to a display.

The recording and/or reproducing apparatus may further include a selector to select a loading calculation equation from the stored loading calculation equations based at least in part on at least a portion of the record information.

The foregoing and/or other aspects and utilities of the general inventive concept may also be achieved by providing a method of controlling a recording and/or reproducing apparatus, the method including the steps of reading record information from a recording medium when the recording medium is inserted into the recording and/or reproducing apparatus, selecting a loading calculation equation from one or more stored loading calculation equations based at least in part on at least a portion of the record information, calculating loading time by using at least a portion of the record information and the selected loading calculation equation, and outputting the calculated loading time to a display.

The record information may include data indicating a type of recording medium, an existence of recorded data on the recording medium, a finalization state of the recording medium (i.e., finalized or unfinalized), the number of titles, or data capacity of the recording medium, or any combination thereof.

The stored loading calculation equations may be based at least in part on a type and a finalization state of the recording medium.

The foregoing and/or other aspects and utilities of the general inventive concept may also be achieved by providing a recording and/or reproducing apparatus including a reading unit to read record information from a recording medium when the recording medium is inserted into the recording and/or reproducing apparatus, and an output unit to output an error message to a display when the record information of the inserted recording medium cannot be read by the reading unit.

The recording and/or reproducing apparatus may also include an output unit so as to display an error message when the read record information from the inserted recording medium comprises data indicating that the recording medium is an unsupported recording medium The recording and/or reproducing apparatus may also include an output unit so as to display an error message when the inserted recording medium is damaged.

The foregoing and/or other aspects and utilities of the general inventive concept may also be achieved by providing a recording and/or reproducing apparatus including a reading unit configured to read record information from a recording medium when the recording medium is inserted into the recording and/or reproducing apparatus, a calculation unit configured to calculate loading time of the inserted recording medium, and an output unit configured to output the calculated loading time to a display.

The foregoing and/or other aspects and utilities of the general inventive concept may also be achieved by providing a recording and/or reproducing apparatus including an output unit to output a loading time of a recording medium according to record information of the recording medium and a calculation.

The output unit may also output a second loading time of a second recording medium according to a second record information of the second recording medium and a second calculation.

The calculation may be different from the second calculation. Alternatively, the calculation may be the same as the second calculation.

The recording medium may be different from the second recording medium. Alternatively, the recording medium may be the same as the second recording medium.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings of which:

FIG. 2 is a table showing the loading calculation equations of a recording medium, which is stored in the storage unit of FIG. 1, in accordance with an embodiment of the present general inventive concept;

DETAILED DESCRIPTION OF THE PREFERRED EMBODIMENTS

Figure 1:
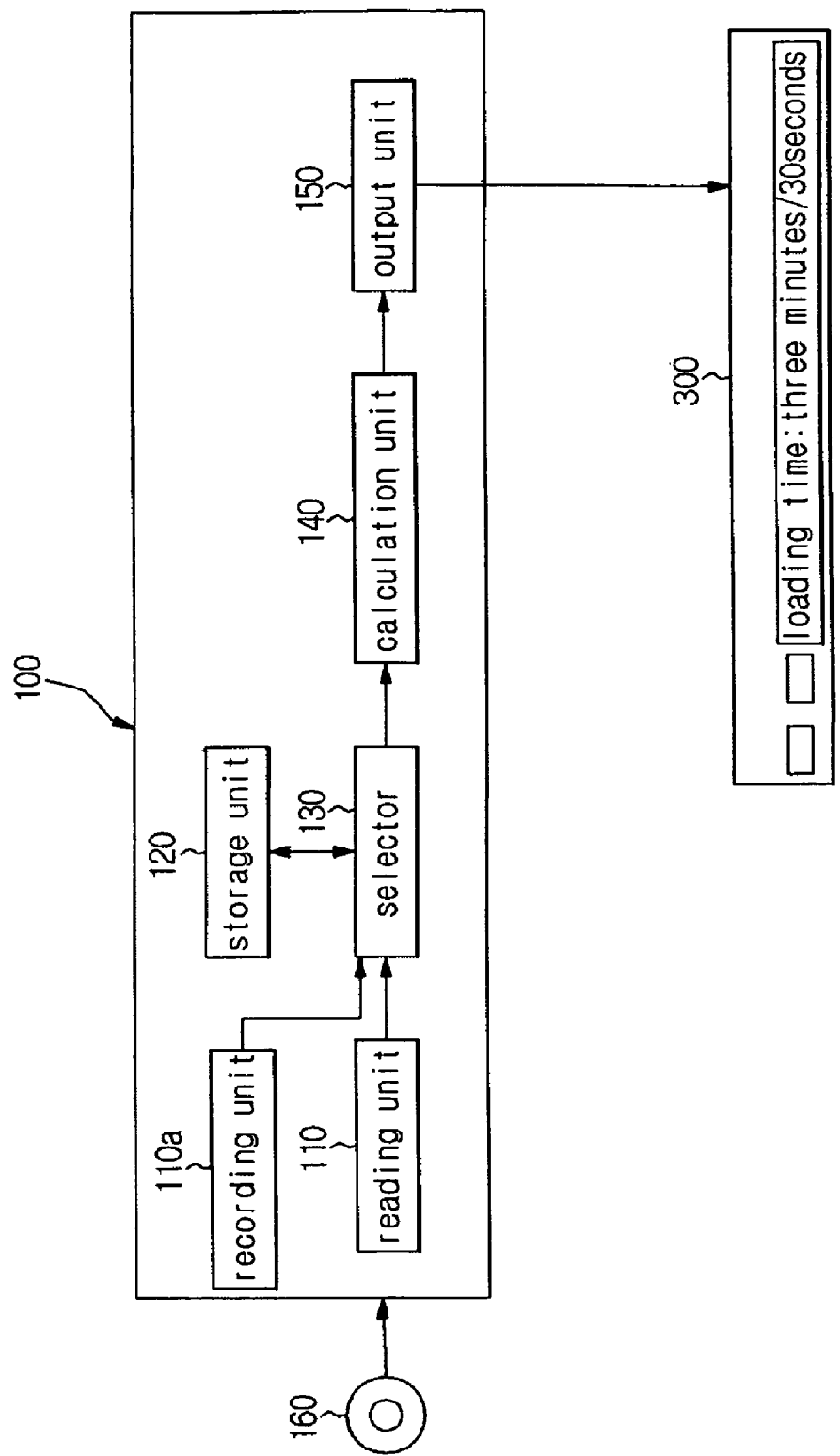
FIG. 1 is a block diagram of a recording and/or reproducing apparatus in accordance with an embodiment of the present general inventive concept.

Reference will now be made in detail to various embodiments of the present general inventive concept, examples of which are illustrated in the accompanying drawings, wherein like reference numerals refer to the like elements throughout. The exemplary embodiments are described below to explain the present general inventive concept by referring to the figures.

FIG. 1 illustrates a recording and/or reproducing apparatus 100 according to one embodiment of the present inventive concept includes a reading unit 110, a recording unit 110a, a storage unit 120, a selector 130, a calculation unit 140, an output unit 150, and display 300. Also illustrated in FIG. 1 is a recording medium 160.

The reading unit 110 and/or recording unit 110a are configured to read record information from a recording medium. In order to read the record information from the recording medium, the recording medium (e.g., recording medium 160) is inserted into the recording and/or reproducing apparatus 100. The recording and/or reproducing apparatus 100 may include, for example, a recorder such as a DVD recorder or a DVD•HDD hybrid recorder having a HDD therein, which can record and reproduce video and/or audio data. The recording and/or reproducing apparatus 100 may also include a device such as a DVD player that reproduces the video and/or audio data.

The record information comprises data indicating at least one type of recording medium, the existence of recorded data of the recording medium, a finalization state of the recording medium (i.e., finalized or unfinalized), the number of titles, and data capacity of the recording medium. The recording medium may include, for example, a DVD-RW (VR), a DVD-RW (Video), a DVD-R (VR), a DVD-R (Video), a DVD+R, a DVD+R (Dual), a DVD+RW, a DVD-Video, any medium that can be reproduced in a DVD recorder and/or a DVD player, or any other suitable digital recording medium.

The existence of recorded data on the recording medium indicates if video, audio, and/or any other audio-visual data has been recorded thereon. A state in which the video and/or audio data has not been recorded on the recording medium may typically be referred to as blank.

The finalized recording medium typically indicates if the recording medium can be used with a recording and/or reproducing apparatus configured to accept the recording medium, as well as with other types of recording and/or reproducing apparatuses. For example, because DVD+R and DVD+RW-based recording media are automatically finalized whenever recording data, the recording media can be reproduced in other types of recording and/or reproducing apparatuses, typically without limitations.

However, DVD-R and DVD-RW-based recording media can be finalized by executing a finalize play button or other suitable command or instruction provided in a recording and/or reproducing apparatus.

An unfinalized recording medium generally refers to a recording medium in which data are recorded according to a specific recording scheme of the recording and/or reproducing apparatus. Such an unfinalized recording medium can be reproduced using other recording and/or reproducing apparatuses by, for example standardizing the navigation of the recording medium.

The title represents an interval between the reproduction start time and the reproduction end time of video and/or audio data of one unit. For example, when two movies are recorded on the recording medium, the number of titles is two.

The storage unit 120 stores the loading calculation equations of the recording medium. FIG. 2 illustrates exemplary loading calculation equations of the recording medium stored in the storage unit 120.

In more detail, the storage unit 120 stores the loading calculation equations based at least in part on the type and/or the finalization state of the recording medium (i.e., finalized or unfinalized).

When a finalized recording medium is inserted into another type of the recording and/or reproducing apparatus 100 for reproduction, the video and/or audio data recorded on the recording medium can be reproduced, but is generally not edited. However, when an unfinalized recording medium is inserted into the recording and/or reproducing apparatus 100, the video and/or audio data can be reproduced and edited.

As described above, in the recording medium set to be finalized in another type of the recording and/or reproducing apparatus 100, only the reproduction of data is possible because the navigation of the recording and/or reproducing apparatus 100 has been standardized regardless of the specific recording scheme of the recording and/or reproducing apparatus 100. However, in an unfinalized recording medium, edition of data as well as reproduction of data is possible because the recording medium stores recording information such as the number of titles and the capacity of data.

Since the DVD+R and DVD+RW-based recording media are typically finalized recording media, the storage unit 120 typically stores the same loading calculation equation regardless of the finalization of the recording medium. However, since the finalization of the DVD-R and DVD-RW-based recording media depends on the execution of the finalize play button or other suitable command or instruction, different loading calculation equations may be stored.

The loading calculation equation may, for example, be determined through tests performed by a producer of the recording and/or reproducing apparatus 100. When various types of recording media are tested, the same microprocessor chip is typically used.

The selector 130 may be configured to select a loading calculation equation corresponding to the record information from the previously stored loading calculation equations (e.g., in storage unit 120).

Referring to FIG. 2, when the type of recording medium is, for example, the DVD-RW (VR) and the recording medium is a finalized recording medium based on the record information read by the reading unit 110 and/or by recording unit 110a, the selector 130 selects (3+P) from a plurality of loading calculation equations stored in the storage unit 120. (3+P) is a loading calculation equation corresponding to the record information, where P is a reference time.

The reference time may be a loading time in the blank state where no data is recorded on the recording medium. In addition, the reference time can be variously set according to the structure of the recording and/or reproducing apparatus 100 and a user's selection.

The calculation unit 140 may be configured to calculate loading time by using the read record information (e.g., from reading unit 110 and/or recording unit 110a) and the selected loading calculation equation (e.g., from selector 130).

That is, as a finalized recording medium (e.g., recording medium 160) is inserted into the recording and/or reproducing apparatus 100, the selector 130 selects a loading calculation equation by using the record information read by the reading unit 110 and/or recording unit 110a, and the calculation unit 140 calculates the loading time by using the read record information and the selected loading calculation equation.

The calculation unit 140 may be configured to calculate the loading time by inputting the record information into the selected loading calculation equation. Referring to FIG. 2, when the type of the record medium is, for example, the DVD-RW (VR) and the record medium is a unfinalized recording medium, the selector 130 selects a (1*0.05n+1*0.001m+P), which is a loading calculation equation corresponding to the DVD-RW (VR), from the loading calculation equations stored in the storage unit 120. In the exemplary equations illustrated in FIG. 2, "m" is the data capacity of the recording medium, and "n" is the number of titles. Using the above-indicated exemplary equation for the DVD-RW (VR), when the P is three seconds and the capacity of data is 3 MB and the number of titles is 10, the calculation unit 140 calculates the loading time of (1*0.05*10+1*0.001*3+3=3.53).

Figure 3:
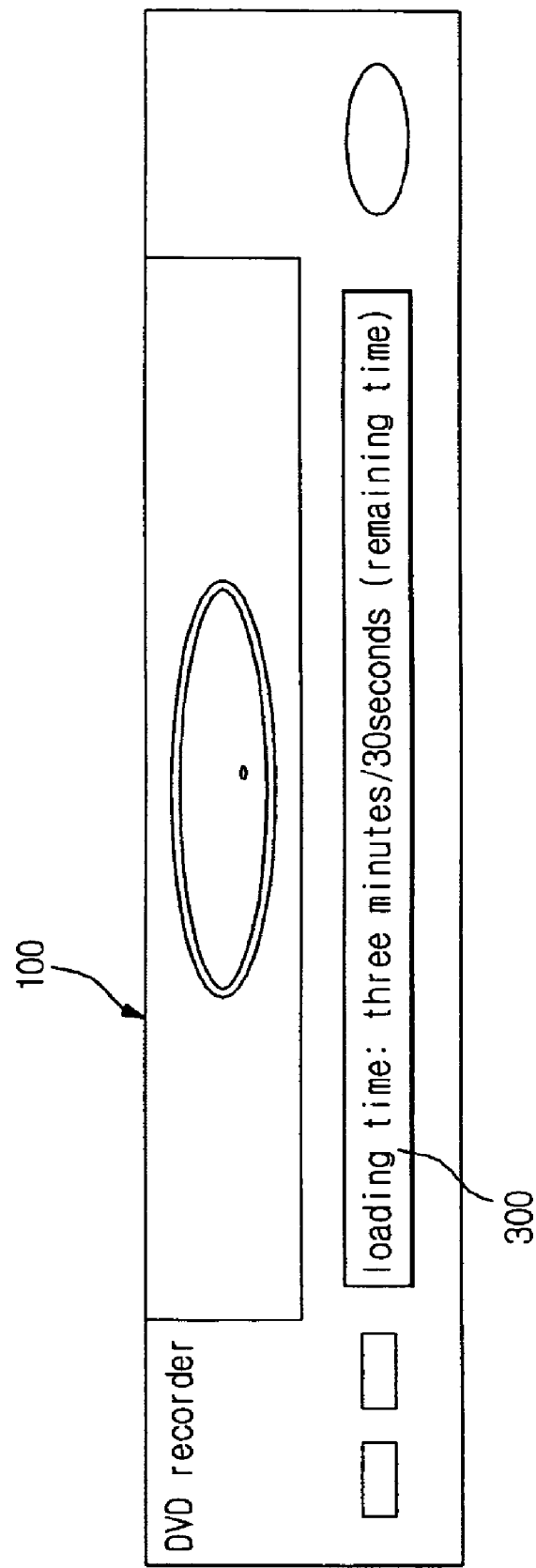
FIG. 3 is a view showing loading time of a recording medium, which is output to a display communicatively coupled to the recording and/or reproducing apparatus of FIG. 1, in accordance with an embodiment of the present general inventive concept.

FIG. 3 is an exemplary illustration of the loading time of the recording medium output to a display (e.g., display 300). As illustrated in FIGS. 1 and 3, the output unit 150 (of FIG. 1) outputs the calculated loading time to display 300.

The display 300 may be installed on the recording and/or reproducing apparatus 100, or may be connected to the recording and/or reproducing apparatus 100 through a wired or wireless communicative connection. The display 300 may include a display area to display data or other information generated by recording and/or reproducing apparatus 100.

The display may include, but is not limited to, a display installed at an operation panel section of the recording and/or reproducing apparatus 100. The display may indicate the total loading time, the remaining time, or any other suitable information.

For example, when the total loading time of the recording medium is three minutes, if two minutes 30 seconds pass, the remaining time of 30 seconds is output to the display. Accordingly, users can view the display to determine the remaining loading time.

When an erroneous and/or unsupported recording medium is inserted into the recording and/or reproducing apparatus 100, loading time is not calculated (e.g., by calculation unit 140) and output to the display (e.g., display 300) because the reading unit 110 and/or recording unit 110a cannot read the record information.

When the loading time is not calculated as described above, the recording and/or reproducing apparatus 100 may determine that infinite loading has occurred, and the erroneous and/or unsupported recording medium is withdrawn or ejected.

Hereinafter, a control process of the recording and/or reproducing apparatus will be described.

Figure 4:
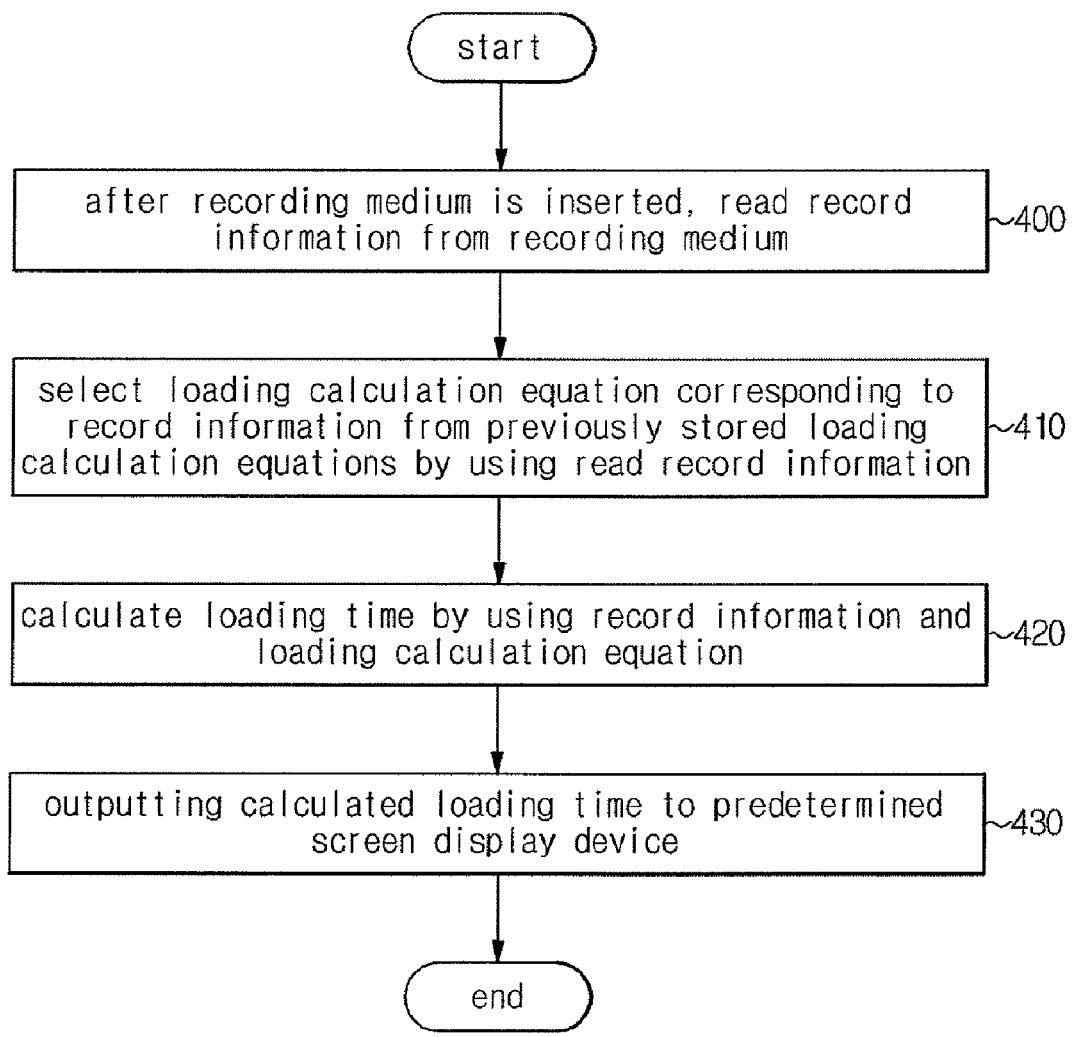
FIG. 4 is a flow diagram illustrating a control process of a recording and/or reproducing apparatus according to an embodiment of the present inventive concept.

FIG. 4 is a flow diagram illustrating the control process of the recording and/or reproducing apparatus according to an exemplary embodiment of the present inventive concept. As illustrated in FIG. 4, the record information is read from the recording medium at operation 400.

The record information may include, but is not limited to at least one of the type of the recording medium, the existence of recorded data on the recording medium, the finalized recording medium, the number of titles, or the data capacity of the recording medium, or any combination thereof, or any other suitable record information.

A loading calculation equation corresponding to the record information is selected from previously stored loading calculation equations by using the read record information at operation 410.

In more detail, the loading calculation equations are previously stored according to, at least in part, the type and/or finalization state of the recording medium (i.e., finalized or unfinalized). The loading calculation equation corresponding to the record information is selected from the previously stored loading calculation equations by using the record information based on the type and/or finalization state of the recording medium.

Loading time is calculated using the read record information and the selected loading calculation equation at operation 420.

The loading time calculated in operation 420 is output to the display at operation 430.

According to the recording and/or reproducing apparatus and the control method thereof as described above, the loading time of the recording medium is provided to users through the display, so that the users can efficiently utilize the loading time.

Further, when an erroneous and/or unsupported recording medium is inserted into the recording and/or reproducing apparatus, the users can determine if an error has occurred in the recording medium as the loading time is not output to the display.

The loading time of the recording medium is output to the display to providing greater convenience and utility to the users.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A recording and/or reproducing apparatus comprising:
   a storage device configured with a plurality of loading calculation equations;
   a calculation device to calculate loading time of a recording medium when the recording medium is inserted into the recording and/or reproducing apparatus, where the load time is calculated according to one or more loading calculation equations selected from the plurality of loading calculation equations stored in the storage device according to a type of the recording medium; and
   an output device to output the calculated loading time to a display.

2. The apparatus of claim 1, further comprising:
   a reading device configured to read record information from the inserted recording medium.

3. The apparatus of claim 2, further comprising:
   wherein the plurality of loading calculation equations are at least in part based on record information.

4. The apparatus of claim 2, wherein the record information comprises:
   data indicating at least one type of recording medium, an existence of recorded data on the recording medium, a finalization state of the recording medium, number of titles, or data capacity of the recording medium, or any combination thereof.

5. A recording and/or reproducing apparatus comprising:
   a reading device configured to read record information from a recording medium when the recording medium is inserted into the recording and/or reproducing apparatus;
   a storage device configured with a plurality of loading calculation equations, wherein the equations are based on at least one type of recording medium;
   a calculation device configured to calculate loading time of the inserted recording medium by using at least a portion of the record information and at least one of the plurality loading calculation equations selected from the storage device according to a type of the recording medium; and
   an output device configured to output the calculated loading time to a display.

6. The apparatus of claim 5, wherein the record information comprises:
   data indicating the type of the recording medium, a finalization state of the recording medium, data capacity of the recording medium, or number of titles, or any combination thereof.

7. The apparatus of claim 5, further comprising:
   a selector configured to select a loading calculation equation from the plurality of stored loading calculation equations based at least in part on at least a portion of the record information.

8. A recording and/or reproducing apparatus comprising:
   a reading device configured to read record information from a recording medium when the recording medium is inserted into the recording and/or reproducing apparatus;
   a storage device configured with a plurality of loading calculation equations based at least in part on a type and finalization state of a recording medium;
   a calculation device configured to calculate loading time by using at least a portion of the record information, at least one equation of the plurality of stored loading calculation equations; and
   an output device configured to output the calculated loading time to a display.

9. The apparatus of claim 8, further comprising:
a selector configured to select a loading calculation equation from the stored plurality of loading calculation equations based at least in part on at least a portion of the record information.

10. A method of controlling a recording and/or reproducing apparatus, the method comprising:
reading record information from a recording medium when the recording medium is inserted into the recording and/or reproducing apparatus;
selecting a loading calculation equation from a plurality of stored loading calculation equations based at least in part on at least a portion of the record information according to a type of the recording medium;
calculating loading time by using at least a portion of the record information and the selected loading calculation equation; and
outputting the calculated loading time to a display.

11. The method of claim 10, wherein the record information comprises:
data indicating at least one type of recording medium, an existence of recorded data on the recording medium, a finalization state of the recording medium, number of titles, or data capacity of the recording medium, or any combination thereof.

12. The method of claim 10, wherein the plurality of stored loading calculation equations are based at least in part on a type and finalization state of a recording medium.

13. A recording and/or reproducing apparatus, comprising:
a storage device configured with a plurality of loading calculation equations;
a reading device configured to read record information from a recording medium when the recording medium is inserted into the recording and/or reproducing apparatus;
a calculation device configured to calculate loading time of the inserted recording medium according to one or more loading calculation equations selected from the plurality of loading calculation equations stored by the storage device according to a type of the recording medium; and
an output device configured to output the calculated loading time to a display.

14. The apparatus of claim 1, wherein the output device outputs remaining loading time.

15. The apparatus of claim 5, wherein the output device outputs remaining loading time.

16. The apparatus of claim 8, wherein the output device outputs remaining loading time.

17. The method of claim 10, wherein the display outputs remaining loading time.

18. The apparatus of claim 13, wherein the output device outputs remaining loading time.

19. The apparatus of claim 1, wherein the one or more loading calculation equations selected by the calculation device are different for at least two different recording mediums.

20. The apparatus of claim 1, wherein the recording medium includes at least one of DVD-RW (VR), DVD-RW (Video), DVD-R(VR), DVD-R(Video), DVD+R, DVD+R (Dual), DVD+RW, and DVD-Video.

21. The apparatus of claim 5, wherein the one or more loading calculation equations selected by the calculation device are different for at least two different recording mediums.

22. The apparatus of claim 5, wherein the recording medium includes at least one of DVD-RW (VR), DVD-RW (Video), DVD-R(VR), DVD-R(Video), DVD+R, DVD+R (Dual), DVD+RW, and DVD-Video.

23. The apparatus of claim 8, wherein the one or more loading calculation equations selected by the calculation device are different for at least two different recording mediums.

24. The apparatus of claim 8, wherein the recording medium includes at least one of DVD-RW (VR), DVD-RW (Video), DVD-R(VR), DVD-R(Video), DVD+R, DVD+R (Dual), DVD+RW, and DVD-Video.

25. The method of claim 10, wherein the one or more stored loading calculation equations are different for at least two different recording mediums.

26. The method of claim 10, wherein the recording medium includes at least one of DVD-RW (VR), DVD-RW (Video), DVD-R(VR), DVD-R(Video), DVD+R, DVD+R(Dual), DVD+RW, and DVD-Video.

27. The method of claim 13, wherein the loading calculation equations selected by the calculation unit are different for at least two different recording mediums.

28. The method of claim 13, wherein the recording medium includes at least one of DVD-RW (VR), DVD-RW (Video), DVD-R(VR), DVD-R(Video), DVD+R, DVD+R(Dual), DVD+RW, and DVD-Video.

* * * * *